United States Patent [19]
Takano et al.

[11] Patent Number: 4,734,087
[45] Date of Patent: Mar. 29, 1988

[54] HIGH LOAD TRANSMISSION BELT

[75] Inventors: Hiroshi Takano, Miki; Shinichi Takagi, Nishinomiya; Kiyokazu Wada, Miki; Sadaichi Konishi; Nobuo Okumura, both of Kobe; Tomizo Kanaoka; Kouji Matsuo, both of Kobe, all of Japan

[73] Assignee: Mitsuboshi Belting Ltd., Nagata, Japan

[21] Appl. No.: 32,868

[22] Filed: Mar. 31, 1987

[30] Foreign Application Priority Data

Mar. 31, 1986 [JP] Japan .............................. 61-48854[U]
Jun. 9, 1986 [JP] Japan .............................. 61-87705[U]
Jun. 12, 1986 [JP] Japan .............................. 61-90332[U]

[51] Int. Cl.$^4$ ............................ F16G 1/10; F16G 1/22
[52] U.S. Cl. ............................ 474/270; 474/244
[58] Field of Search ................. 474/265–268, 474/270, 272, 238–240, 242, 244, 201

[56] References Cited

U.S. PATENT DOCUMENTS

| 1,862,198 | 6/1932 | Reeves | 474/244 |
| 4,642,080 | 2/1987 | Takano et al. | 474/244 |
| 4,655,732 | 4/1987 | Takashima | 474/242 X |

FOREIGN PATENT DOCUMENTS

| 306233 | 2/1929 | United Kingdom | 474/244 |
| 537882 | 7/1941 | United Kingdom | 474/244 |

Primary Examiner—Stephen J. Novosad
Assistant Examiner—Thuy M. Bui
Attorney, Agent, or Firm—Wood, Dalton, Phillips, Mason & Rowe

[57] ABSTRACT

A power transmission belt structure including a flexible neutral belt portion, a plurality of blocks secured to the flexible belt portion seriatim longitudinally thereof, and heat conducting structure disposed between the flexible belt and blocks for conducting away from the flexible belt heat generated as a result of power transmission operation of the belt structure. A number of different embodiments utilizing the heat conducting structure are disclosed. In certain of the embodiments, the heat conducting structure extends partially about the blocks and, in certain of the embodiments, the heat conducting structure extends fully thereabout. In certain embodiments, the reduced midportion of the block is provided with the heat conducting structure recessed therein. In one form, a protective outer coating is provided on the heat conducting structure.

29 Claims, 10 Drawing Figures

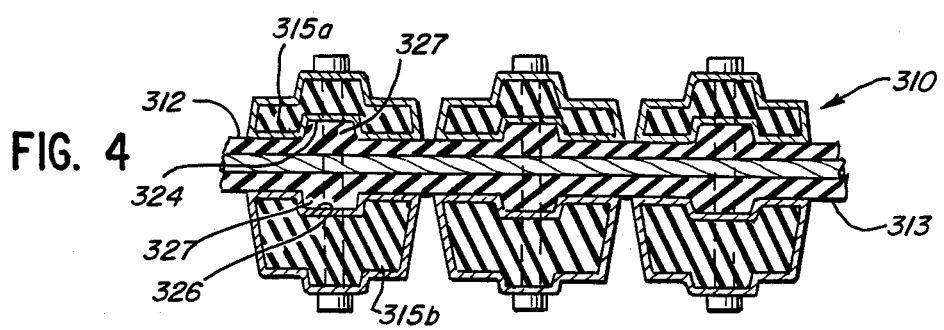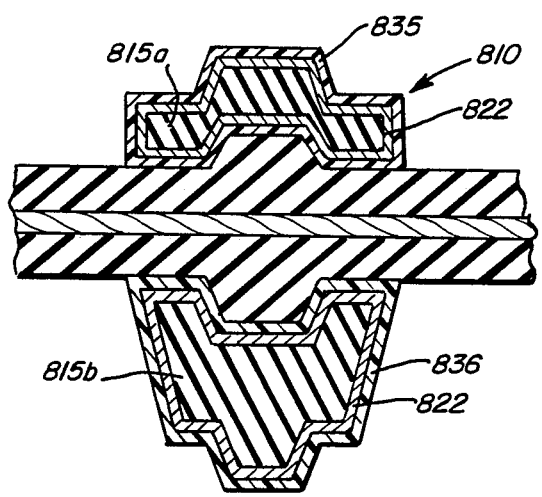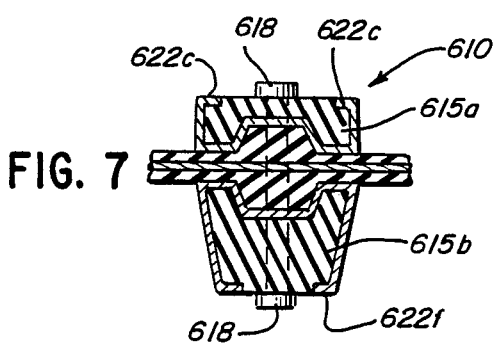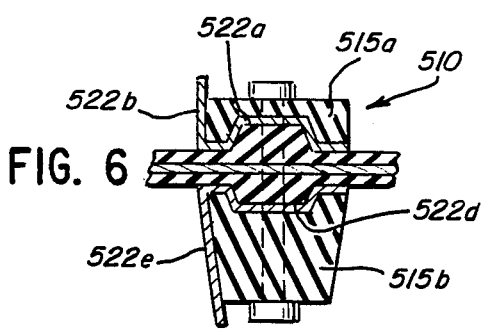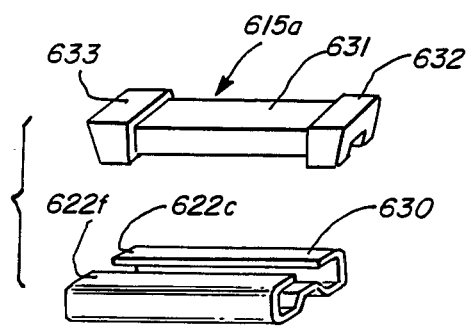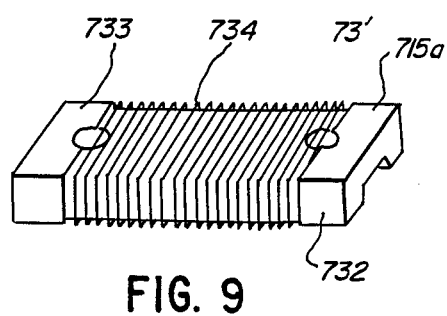

4,734,087

HIGH LOAD TRANSMISSION BELT

TECHNICAL FIELD

This invention relates to power transmission belts and in particular to power transmission belts intended to carry high loads.

BACKGROUND ART

In one known form of high load power transmission belt, relatively hard blocks are secured to the flexible looped belt for engagement with the sidewalls of the pulley grooves in transferring power between the pulley and belt structure. The blocks are secured to the belt seriatim longitudinally of the belt by suitable securing means, such as bolts, rivets, etc., extending through the block and belt.

In one improved form of such high load power transmitting belt, blocks are provided on opposite sides of the belt, with the block-securing means serving to clamp the belt therebetween.

The blocks conventionally extend fully across the belt and define side edge faces having facial engagement with the opposed surfaces of the pulley groove.

A problem arises in such high load transmission belts in that substantial heat is generated in the operation thereof. The heat has been found to be developed as a result of the flexing of the belt material, the friction between the blocks and the flexible belt portion, and friction between the bolt and pulley and groove surfaces.

Such increased temperature of the belt causes degradation of the belt materials, reduced desired adhesion between the tensile cords of the belt and the cover in which the tensile cords are embedded, wear of the belt materials, softening of the blocks, etc., resulting in a shortened useful life of the belt.

DISCLOSURE OF INVENTION

The present invention comprehends an improved high load power transmission belt having novel means for maintaining low temperature operation of the belt during power transmission use.

More specifically, the invention comprehends the provision of heat conducting means in thermal transfer association with the flexible portion of the belt.

The invention further comprehends an arrangement of the heat conducting means for dissipating heat to the ambient atmosphere from the flexible belt.

Where the belt structure incorporates blocks on opposite sides of the flexible belt portion, heat conducting means may be provided on either or both surfaces of the flexible belt portion within the broad scope of the invention.

The invention further comprehends extending the heat conducting means outwardly away from the flexible belt portion for improved heat transfer to the ambient atmosphere.

In one form, the heat conducting means extends to the outer face of the block.

In another form of the invention, it extends outwardly from the flexible belt portion into overlying relationship with at least a portion of the outer face of the block.

The block may be provided with an outwardly projecting wall, or rib, and the heat conducting means may be extended into overlying relationship with the wall so as to provide improved heat transfer to the ambient atmosphere.

In one form of the invention, the flexible belt portion and blocks are provided with cooperating convex/concave interlock means.

The blocks define side edge faces adapted to engage the pulley groove surfaces in transferring power between the pulley and belt structure, the side edge faces of the blocks being free of the heat conducting means.

In one form, the heat conducting means comprises a layer of thermally conductive material overlying all portions of the blocks other than the side edge faces thereof.

The heat conducting means, in the illustrated embodiment, comprises a thin layer of thermally conductive material which illustratively may comprise a thin film, a fabric, a powder, and the like.

An overlying cover of synthetic resin may be applied to the thermally conductive layer to prevent flaking and the like.

In the illustrated embodiment, the heat conducting means is formed of a thermally conductive material, such as metal.

In one embodiment, a portion of the heat conducting means is disposed between adjacent blocks. The confronting conducting elements therebetween, in one form, are in longitudinally spaced relationship and, in another form, are in thermal contact association with each other.

The means for securing the blocks to the flexible belt portion further define means for clamping the heat conducting means against the flexible belt portion to have high thermal transfer association therewith.

The heat conducting means may be extended fully about the blocks longitudinally of the belt structure.

In one form, the heat conducting means comprises an elongated element, such as wire wrapped about the block.

The midportion of the block intermediate the side faces thereof may be reduced in cross section so as to accommodate a thick heat conducting layer in effectively recessed arrangement relative to the opposite side portions of the blocks.

The securing means may comprise thermally conductive elements extending through the heat conducting means for further conducting heat away from the flexible belt portion.

The high load power transmission belt of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein:

FIG. 4 is a fragmentary longitudinal section of still another form of power transmission belt embodying the invention;

FIG. 6 is a fragmentary longitudinal section of still another form of power transmission belt embodying the invention;

FIG. 7 is a fragmentary longitudinal section illustrating another form of a power transmission belt embodying the invention;

FIG. 8 is an exploded view of the block and heat conducting elements of the embodiment of FIG. 7;

FIG. 9 is a perspective view illustrating yet another form of block and heat conducting means for use in a power transmission belt embodying the invention; and FIG. 10 is a fragmentary longitudinal section illustrating the use of an outer protective coating about the heat conducting layer in a further modified form of power transmission belt embodying the invention.

BEST MODE FOR CARRYING OUT THE INVENTION

Figure 1:
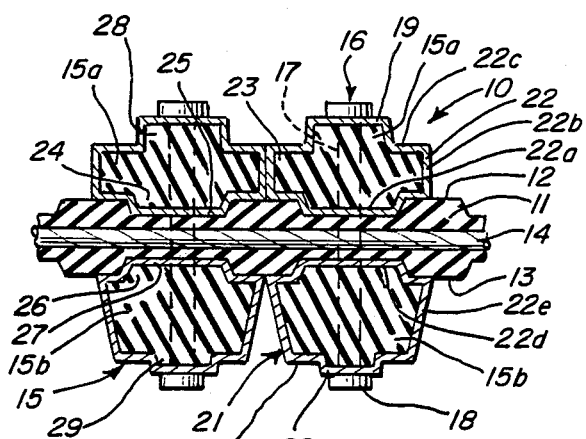
FIG. 1 is a fragmentary longitudinal section of a power transmission belt embodying the invention.

In the illustrative embodiment of the invention as disclosed in FIG. 1 of the drawing, a power transmission belt structure generally designated 10 is shown to comprise a flexible neutral belt portion 11 defining opposite faces 12 and 13 and having extending longitudinally therethrough a plurality of tensile cords 14 of conventional construction.

The belt further includes a plurality of force transfer blocks 15 formed of relatively rigid material for engagement with the side surfaces of the pulley grooves (not shown) with which the side edge faces of the blocks are engaged in the power transmission operation of the belt structure.

As shown, a pair of blocks, such as blocks 15a and 15b, are secured to the opposite flexible belt surfaces 12 and 13 by suitable securing means 16 which may comprise bolts, rivets, etc. The securing elements include shank portions 17 extending through the blocks and flexible belt portion, and heads 18 outwardly of the outer surfaces 19 and 20 of the respective blocks. The securing elements are preferably formed of a strong material which may also be thermally conductive, such as metal.

The invention comprehends the provision of heat conducting means generally designated 21 for conducting heat away from the flexible belt portion 11. As shown in FIG. 1, the heat conducting means may comprise a layer 22 of thermally conductive material extending about the blocks.

In the embodiment of FIG. 1, the thermally conductive layer about block 15a includes an inner portion 22a in heat transfer association with outer surface 12 of the flexible belt portion 11, side portions 22b on the longitudinally opposite transverse faces 23 of the block and an outer portion 22c on the outer surface 19 of the block. Similarly, the thermally conductive layer on block 15b includes an inner portion 22d on the inner surface of the block, portions 22e on the transverse faces of the block, and portion 22f on the outer surface of the block.

As further shown in FIG. 1, the blocks and flexible belt portion may be provided with cooperating interlocking means in the form of cooperating convex/concave portions thereof. Thus, more specifically, as seen in FIG. 1, block 15a may include an inwardly projecting convex portion 24 received in an outwardly opening concave portion 25 of the belt surface 12. Block 15b is provided with an inwardly projecting convex portion 26 received in an outwardly opening concave portion 27 of the flexible belt surface 13.

As further illustrated in FIG. 1, block 15a includes an outer projecting wall portion 28 and block 15b is provided with an outwardly projecting convex wall 29.

In belt structure 10, the transverse surface portions 22b of the heat conductive layers of the successive blocks are in facial engagement.

The securing means 16, as shown, not only secures the blocks to the flexible belt portion 11, but also clamps the inner portions 22a and 22e of the heat conducting layers into good thermal transfer association with the flexible belt surfaces 12 and 13.

As further shown in FIG. 1, the heads 18 of the securing elements clamp the outer portions 22c and 22f of the heat conducting layers of the respective blocks to the outer wall portions 28 and 29 thereof.

As the wall portions 28 and 29 effectively define ribs extending transversely across the opposite sides of the belt, the thermally conductive layer portion thereon may have excellent heat transfer association with the ambient atmosphere as the belt travels therethrough in its power transmission operation. Further, as the heads of the securing elements are in transverse association with the outermost conducting portions 22c and 22f, further improved heat transfer from the flexible belt portion to the ambient atmosphere is provided.

In the illustrated embodiment, the heat conducting layer is formed of thermally conductive material, such as metal, and illustratively may comprise a film of aluminum, brass, copper, zinc, silicon, nickel, magnesium, titanium, etc., and alloys thereof. The thermally conductive layer may comprise a thin film, a sheet, a corded fabric or cloth, spirally wound metal wire or ribbon, metal power embedded in a suitable matrix, such as a synthetic resin matrix, etc.

The thermally conductive layer may be bonded to the block and flexible belt portion by suitable bonding materials, mechanically retained in association therewith, such as by wrapping, fitting, etc., clamped as by the securing means as discussed above, etc.

The flexible belt portion surfaces 12 and 13 may be provided with fabric or may be uncovered, as shown in FIG. 1, as desired. The tensile cords may comprise conventional tensile cords formed of polyester, aliphatic polyamide, aromatic polyamide resins, glass fibers, metal wires, etc. The body of rubber in which the tensile cords are embedded may be formed of conventional material, such as natural rubber, styrene butadiene rubber, chloroprene rubber, nitrile rubber, butyl rubber, chlorosulfonated polyethylene, SPT, EPR, epichlorohydrine, polyurethane, etc.

The blocks 15, as discussed above, are preferably formed of relatively hard material having a Shore scale hardness of 85 or more, and are illustratively formed of rigid polyurethane, phenol, epoxy, nylon, polyester, acrylic, and polyamide resins. The resins may have mixed therewith reinforcing elements, such as cotton yarn, chemical fibers, glass fibers, metal fibers, etc., or layers of canvas.

The invention comprehends the provision of such belts with blocks on only one of the faces of the flexible belt portion, as well as on both faces, as shown in FIG. 1.

Figure 2:
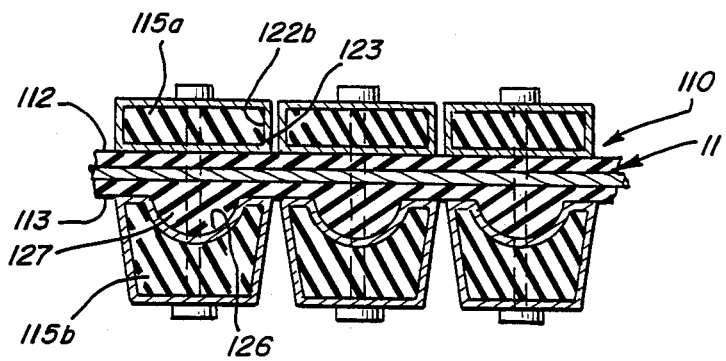
FIG. 2 is a fragmentary longitudinal section of a modified form of power transmission belt embodying the invention.

As further will be obvious to those skilled in the art, the interlocking means 24,25 and 26,27 of the blocks and flexible belt portion may be reversed, i.e. the convex portion may be provided on the flexible belt portion and the concave portion may be provided in the blocks, or eliminated. Thus, as shown in FIG. 2, the surface 112 of the flexible belt portion 111 of the belt is flat and the corresponding block 115a has a flat inner surface. The opposite surface 113 of the flexible belt portion defines a convex portion 127 received in a concave portion 126 of the block 115b.

Further, as illustrated in FIG. 2, the thermally conductive layer portions 122b on the transverse side faces 123 of the blocks 115a are spaced from the confronting faces so as to space the layer portions 122b apart rather than in facial engagement, as in belt structure 10.

In all other respects, the construction and operation of belt structure 110 is similar to that of belt structure of FIG. 1.

Figure 3:
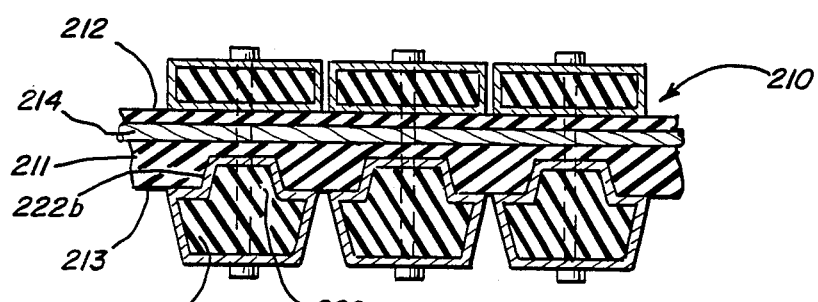
FIG. 3 is a fragmentary longitudinal section of a further modified form of power transmission belt embodying the invention.

A belt structure generally designated 210 is shown in FIG. 3 to comprise a belt structure similar to belt structure 110 of FIG. 2, but wherein the flexible belt portion 211 is relatively thick, with the tensile cords 214 disposed more closely adjacent the outer surface 212 and the inner surface 213. The convex portion 226 of the blocks 215b thusly is higher than the convex portion 26 of blocks 15b of belt 10, whereby the sidewall portions 222b of the heat conducting means extend more deeply into the flexible belt portion 211 for improved heat transfer association therewith.

As shown in FIG. 4, a further modified form of belt embodying the invention generally designated 310 is shown to comprise a belt generally similar to belt 10, but wherein the outer surface 312 of the flexible belt portion is provided with a convex portion 327 and the block 315a inner portion 324 is concave. Similarly reversely, the inner surface 313 of the flexible belt portion defines a convex portion 327 and the inner block 315b defines a concave surface 326 receiving the belt portion 327. Thus, belt 310 is reversely similar to belt 10.

Figure 5:
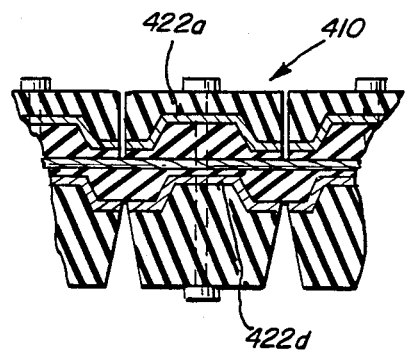
FIG. 5 is a fragmentary longitudinal section of yet another form of power transmission belt embodying the invention.

As shown in FIG. 5, the invention comprehends the provision of the heat conducting means to extend less than fully about the blocks. Thus, in belt 410 shown in FIG. 5, only the innermost heat conducting portions 422a and 422d are provided.

Alternatively, as shown in FIG. 6, a further modified form of power transmission belt structure generally designated of power transmission belt structure generally designated 510 is provided with a heat conducting means utilizing the innermost portion 522a and one side portion 522b only. Similarly, the heat conducting means associated with block 515b utilizes only the innermost portion 522d and one side portion 522e.

As further illustrated in FIGS. 7 and 8, the invention comprehends the provision of still another form of modified belt structure embodying the invention generally designated 610 wherein the heat conducting means includes portions 622c extending only partially inwardly toward the bolt head 618 and portions 622f on block 615b extending only partially inwardly toward the bolt head 618 thereof.

As illustrated in FIG. 8, the heat conducting elements may comprise preformed, generally C-shaped tubular elements 630, which may be fitted to a reduced section midportion 631 of the blocks so as to be effectively recessed between the larger end portions 632 and 633 thereof.

Still another form of heat conducting means for use in the belt structures of the invention is illustrated in FIG. 9 wherein the heat conducting means comprises an elongated element, such as a wire 734 wrapped around the reduced midportion 731 of the block 715a. Any suitable elongated element may be utilized, such as metal ribbon, wire, etc.

The heat conducting means may be provided with an outer protective coating, or layer, as illustrated in FIG. 10, wherein still another modified form of belt structure generally designated 810 is shown to be provided with an outer coating 835 overlying the thermal conductive layer 822 of outer block 815a, and a similar protective layer 836 overlying the thermal conductive layer 822 of the inner block 815b. The outer protective layer is preferably formed of a suitable synthetic resin which may also have thermally conductive characteristics. Alternatively, the protective layer may be formed of the same material as that from which the block is formed, within the broad scope of the invention. The protective layer prevents flaking and other degradation of the thermally conductive layer, as may occur in operation of the power transmission belt structure.

In the illustrated embodiment, the thermally conductive layer may have a thickness in the range of approximately 0.02 to 0.5 mm., and preferably in the range of 0.05 to 0.2 mm. The protective resin layer may have a thickness in the range of approximately 0.2 mm. to 1 mm. Where the recessed midportion of the block is utilized, such as in block 615a and 715a, the thickness of the thermally conductive elements may be increased. Where the thermally conductive elements extend fully to the side faces of the blocks engaging the pulley groove surfaces, it is preferable that relatively thin thermally conductive elements be utilized to minimize frictional heat generation between the heat conductive elements and pulley surfaces.

Because of the facility with which metal sheet may be formed into the desired configurations, the use of metal sheet as the heat conducting element has been found particularly advantageous. Such sheet may be made to have a thickness in the range of approximately 0.1 to 1 mm., and thus, is advantageously adapted for use in the form illustrated in FIG. 8.

The length of the extensions 522b and 522e, in FIG. 6, provides for improved heat transfer to the ambient atmosphere as a result of the finlike effect somewhat similar to the projecting configuration of the heat conducting means where the projecting portions, such as portions 28 and 29 of FIG. 1, are utilized in the blocks.

We claim:

1. A power transmission belt structure comprising:
   a flexible belt;
   a plurality of blocks secured to said flexible belt seriatim longitudinally thereof; and
   heat conducting means formed of a material having substantially greater thermal conductivity than that of said blocks and being disposed between said flexible belt and blocks for conducting away from the flexible belt heat generated as a result of power transmission operation of said belt structure.

2. The power transmission belt structure of claim 1 wherein said flexible belt and blocks are provided with cooperating interlock means.

3. The power transmission belt structure of claim 1 wherein said blocks define side edge faces adapted to engage drive system pulleys, said side edge faces being free of said heat conducting means.

4. A power transmission belt structure comprising:
   a flexible belt;
   a plurality of blocks secured to said flexible belt seriatim longitudinally thereof; and heat conducting means disposed between said flexible belt and blocks for conducting away from the flexible belt heat generated as a result of power transmission operation of said belt structure, said blocks defining side edge faces adapted to engage drive system pulleys, and said heat conducting means comprising a layer of thermally conductive material overlying all portions of said blocks other than said side edge faces.

5. A power transmission belt structure comprising:
a flexible belt;
a plurality of blocks secured to said flexible belt seriatim longitudinally thereof; and
heat conducting means disposed between said flexible belt and blocks for conducting away from the flexible belt heat generated as a result of power transmission operation of said belt structure, said heat conducting means comprising a thin layer of thermally conductive material.

6. The power transmission belt structure of claim 5 wherein said heat conducting means comprises a film formed of thermally conductive material.

7. A power transmission belt structure comprising:
a flexible belt;
a plurality of blocks secured to said flexible belt seriatim longitudinally thereof; and
heat conducting means disposed between said flexible belt and blocks for conducting away from the flexible belt heat generated as a result of power transmission operation of said belt structure, said heat conducting means comprising a fabric formed of thermally conductive material.

8. A power transmission belt structure comprising:
a flexible belt;
a plurality of blocks secured to said flexible belt seriatim longitudinally thereof; and
heat conducting means disposed between said flexible belt and blocks for conducting away from the flexible belt heat generated as a result of power transmission operation of said belt structure, said heat conducting means comprising a powder formed of thermally conductive material.

9. A power transmission belt structure comprising:
a flexible belt;
a plurality of blocks secured to said flexible belt seriatim longitudinally thereof; and
heat conducting means disposed between said flexible belt and blocks for conducting away from the flexible belt heat generated as a result of power transmission operation of said belt structure, said heat conducting means comprising a layer of thermally conductive material and a layer of synthetic resin covering said layer of thermally conductive material.

10. A power transmission belt structure comprising:
a flexible belt;
a plurality of blocks secured to said flexible belt seriatim longitudinally thereof; and
heat conducting means disposed between said flexible belt and blocks for conducting away from the flexible belt heat generated as a result of power transmission operation of said belt structure, said heat conducting means comprising a layer of thermally conductive metal.

11. The power transmission belt structure of claim 1 wherein said blocks define side edge faces adapted to engage drive system pulleys, said heat conducting means comprising thermally conductive means spaced inwardly from said side edge faces.

12. The power transmission belt structure of claim 1 wherein at least a portion of said heat conducting means is disposed between adjacent blocks.

13. The power transmission belt structure of claim 1 wherein at least a portion of each of said heat conducting means is disposed between adjacent blocks in longitudinally spaced relationship.

14. The power transmission belt structure of claim 1 wherein said blocks define outwardly projecting walls and said heat conducting means extends to said said walls for transferring heat to the ambient atmosphere.

15. A power transmission belt structure comprising:
a flexible belt;
a plurality of blocks secured to said flexible belt seriatim longitudinally thereof; and
heat conducting means extending about said blocks and being formed of a material having substantially greater thermal conductivity than that of said blocks, said heat conducting means including a portion between said flexible belt and blocks for conducting away from the flexible belt heat generated as a result of power transmission operation of said belt structure.

16. The power transmission belt structure of claim 15 wherein said blocks define side edge faces adapted to engage drive system pulleys, and said heat conducting means extends to said faces.

17. The power transmission belt structure of claim 15 wherein said heat conducting means extends fully about said blocks longitudinally of said belt structure.

18. The power transmission belt structure of claim 15 wherein said heat conducting means extends fully about said blocks longitudinally of said belt structure, the heat conducting means of each block being in thermal transfer contact with the heat conducting means of the immediately adjacent blocks.

19. The power transmission belt structure of claim 15 wherein said heat conducting means extends fully about said blocks longitudinally of said belt structure, the heat conducting means of each block being in facially spaced relationship with confronting portions of the heat conducting means of the immediately adjacent blocks.

20. The power transmission belt structure of claim 15 wherein each said block defines an outer face and said heat conducting means extends to said outer face.

21. The power transmission belt structure of claim 15 wherein each said block defines an outer face and said heat conducting means extends to said outer face and at least partially in overlying relationship to said outer face.

22. The power transmission belt structure of claim 15 wherein each said block defines an outer face and said heat conducting means extends to said outer face, said outer face defining longitudinally spaced, transversely extending edges and said heat conducting means extends along a single edge of said outer face.

23. The power transmission belt structure of claim 15 wherein each said block defines an outer face and said heat conducting means extends to said outer face, said outer face defining longitudinally spaced, transversely extending edges and said heat conducting means extends along both edges of said outer face.

24. The power transmission belt structure of claim 15 wherein said heat conducting means comprises an elongated metal element wrapped about said block.

25. A power transmission structure comprising:

a flexible belt;

a plurality of blocks secured to said flexible belt seriatim longitudinally thereof; and heat conducting means extending about said blocks and including a portion between said flexible belt and blocks for conducting away from the flexible belt heat generated as a result of power transmission operation of said belt structure, said heat conducting means comprising an elongated metal wire wrapped about said block.

26. A power transmission belt structure comprising:

a flexible belt;

a plurality of blocks;

securing means for securing said blocks to said flexible belt seriatim longitudinally thereof; and heat conducting means formed of a material having substantially greater thermal conductivity than that of said blocks and being disposed between said flexible belt and blocks for conducting away from the flexible belt heat generated as a result of power transmission operation of said belt structure, said securing means comprising means for clamping said heat conducting means against said flexible belt to have high thermal transfer association therewith.

27. The power transmission belt structure of claim 26 wherein each said block defines an outer face, and said heat conducting means includes a portion overlying said outer face, and said securing means further defines means for clamping said portion to said outer face.

28. The power transmission belt structure of claim 26 wherein said securing means comprises means for clamping pairs of said blocks to opposite sides of said flexible belt and concurrently clamping said heat conducting means associated with said pairs of blocks to opposite sides of said flexible belt to conduct heat concurrently from said opposite sides of the flexible belt.

29. The power transmission belt structure of claim 26 wherein said securing means comprises means for clamping pairs of said blocks to opposite sides of said flexible belt and concurrently clamping said heat conducting means associated with said pairs of blocks to opposite sides of said flexible belt to conduct heat concurrently from said opposite sides of the flexible belt, said securing means comprising thermally conductive means for conducting heat between the heat conducting means of the respective pairs of blocks.

* * * * *